United States Patent
Yang et al.

(10) Patent No.: US 12,267,602 B2
(45) Date of Patent: Apr. 1, 2025

(54) OPTICAL FIELD IMAGING SYSTEM BASED ON DUAL GALVANOMETER SCANNING

(71) Applicant: Zhejiang Hehu Technology Co., Ltd., Hangzhou (CN)

(72) Inventors: Yi Yang, Hangzhou (CN); Jun Yan, Hangzhou (CN)

(73) Assignee: Zhejiang Hehu Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/791,474

(22) Filed: Aug. 1, 2024

(65) Prior Publication Data

US 2024/0397215 A1 Nov. 28, 2024

(30) Foreign Application Priority Data

Aug. 3, 2023 (CN) .......................... 202310968757.9

(51) Int. Cl.
 *H04N 5/335* (2011.01)
 *G02B 26/10* (2006.01)
 *H04N 23/55* (2023.01)
 *H04N 23/957* (2023.01)

(52) U.S. Cl.
 CPC ......... *H04N 23/957* (2023.01); *G02B 26/101* (2013.01); *H04N 23/55* (2023.01)

(58) Field of Classification Search
 CPC .................................................. H04N 23/957
 See application file for complete search history.

(56) References Cited

U.S. PATENT DOCUMENTS

| 12,146,832 B2* | 11/2024 | Schwedt | G02B 21/0076 |
| 2009/0128615 A1* | 5/2009 | Miller | B41M 5/26 347/232 |
| 2011/0002024 A1* | 1/2011 | Sheblee | G02B 21/0044 359/201.2 |

(Continued)

FOREIGN PATENT DOCUMENTS

| CN | 113484296 A | 10/2021 |
| CN | 116224560 A | 6/2023 |

OTHER PUBLICATIONS

CNIPA, Notification of First Office Action for Chinese application CN202310968757.9, Sep. 9, 2023.

(Continued)

*Primary Examiner* — Gary C Vieaux
(74) *Attorney, Agent, or Firm* — Hemisphere Law, PLLC; Zhigang Ma

(57) ABSTRACT

The present invention relates to the technical field of optical imaging, in particular to an optical field imaging system based on dual galvanometer scanning, comprising: an imaging unit, a galvanometer unit, a microlens array, a relay system and a camera which are arranged successively along a transmission direction of an optical path. The imaging unit is used for optically imaging a sample or a scenario. The galvanometer unit is composed of two non-parallel two-dimensional galvanometers which deflect beams in two directions of X axis and Y axis respectively, so that an input beam is perpendicular to an output beam. After the beam outputted by the galvanometer unit passes through the microlens array and the relay system, the beam is collected by the camera to obtain the stack information of optical field images.

6 Claims, 4 Drawing Sheets

(56) References Cited

U.S. PATENT DOCUMENTS

| | | |
|---|---|---|
| 2011/0165522 A1 | 7/2011 | Mann et al. |
| 2017/0146912 A1 | 5/2017 | Mann |
| 2019/0094499 A1 | 3/2019 | Lee et al. |
| 2023/0324661 A1* | 10/2023 | Anhut .................. G02B 21/082 348/46 |

OTHER PUBLICATIONS

CNIPA, Notification of Second Office Action for Chinese application CN202310968757.9, Oct. 11, 2023.
CNIPA, Notification to grant patent right for Chinese application CN202310968757.9, Oct. 28, 2023.

* cited by examiner

OPTICAL FIELD IMAGING SYSTEM BASED ON DUAL GALVANOMETER SCANNING

TECHNICAL FIELD

The present invention relates to the technical field of optical imaging, in particular to an optical field imaging system based on dual galvanometer scanning.

BACKGROUND

Metastasis of tumor cells in living bodies is random. Thus, dynamic observation of three-dimensional information in the research of living samples can help to better understand the metastasis mechanism of the tumor cells. Because of the limitations of the technology, traditional optical imaging systems achieve the purpose of three-dimensional imaging through scanning, which takes a lot of time and makes it difficult to capture the dynamic process of rapid metastasis of the tumor cells. In recent years, the emerging optical field microscopic imaging system obtains three-dimensional information of samples through a single shot, and is a popular instrument in current research. However, under the influence of imaging principles, a finally reconstructed image has a low resolution, which greatly limits the research of the subcellular structure in the tumor cells.

Previous researches have shown that the addition of a scanning device to the optical field microscopic imaging system can greatly improve the resolution of the reconstructed image, but other problems are subsequently introduced. At present, a single two-dimensional galvanometer is generally used for deflection in x and y directions to realize the scanning function in the process of optical field imaging. However, because of deflection of a single galvanometer in two directions, a central optical axis is deflected and inconsistency between a deflection angle and a preset angle and the phenomenon of precession will occur, as shown in FIG. 1. The finally reconstructed image has the problems of rotation, stripes and sawteeth, thereby affecting the observation of users for the image.

Therefore, how to improve the quality of the reconstructed image of a scanning optical field imaging system is an urgent problem for those skilled in the art.

SUMMARY

In view of this, the present invention provides an optical field imaging system based on dual galvanometer scanning, which can avoid the problems of stripes and sawteeth of the reconstructed image caused by single galvanometer scanning, and improve the quality of the reconstructed image.

In order to achieve the above purpose, the present invention adopts the following technical solution:

An optical field imaging system based on dual galvanometer scanning comprises: an imaging unit, a galvanometer unit, a microlens array, a relay system and a camera which are arranged successively along a transmission direction of an optical path.

The imaging unit is used for optically imaging a sample or a scenario, and inputting an imaging beam into the galvanometer unit.

The galvanometer unit is composed of two non-parallel two-dimensional galvanometers which deflect beams in two directions of X axis and Y axis respectively, so that an input beam is perpendicular to an output beam.

The microlens array is located at an image plane position, and used for obtaining beams of different angles at different spatial local positions outputted by the galvanometer unit, and modulating the information corresponding to different angles to different spatial positions corresponding to each microlens.

The relay system is used for realizing connection and regulation of the optical path so that the beams modulated by the microlens array are imaged on the camera.

The camera is used for performing an exposure imaging after each deflection of the galvanometer unit to obtain stack information of optical field images.

Further, the galvanometer unit comprises a first galvanometer and a second galvanometer; O-XYZ is set as an established world coordinate system, wherein XOY is a horizontal plane, a rotation shaft of the first galvanometer is parallel to a Y axis, a rotation shaft of the second galvanometer is parallel to an X axis, and starting positions of the first galvanometer and the second galvanometer are at an angle of 45° with the XOY plane; and the input beam is inputted from an XO direction, transmitted in an OZ direction, and outputted from an OY direction.

Further, deflection states of two two-dimensional galvanometers in the galvanometer unit are controlled by a piezoelectric ceramic motor.

Further, the galvanometer unit is deflected according to a set scanning mode, and the scanning mode is set on the basis that a corresponding image plane is offset by an integer number of pixel points on the camera when the galvanometer unit is deflected.

Further, the relay system comprises two convex lenses, and the beam is widened or narrowed by selecting lenses of different focal lengths to match the imaging of the camera for the microlens array.

Further, a signal receiving surface of the camera is located at a rear focal plane of the relay system.

Further, the optical field imaging system further comprises a control unit; the control unit is used for triggering the galvanometer unit to deflect and trigger the camera for exposure imaging after each deflection of the galvanometer unit; and in the process of exposure imaging of the camera, the galvanometer unit is controlled not to deflect.

Further, the optical field imaging system further comprises a three-dimensional reconstruction unit; the three-dimensional reconstruction unit is used for rearranging spatial pixels corresponding to the same spatial frequency component in the stack information of optical field images, and locating a central view corresponding to each microlens; and RL deconvolution iterative calculation of each central view is performed by using a corresponding theoretical point spread function of the central view, to perform three-dimensional reconstruction of the optical field images, wherein the theoretical point spread function of the central view is obtained by pre-simulation.

According to the above technical solution, compared with the prior art, the present invention discloses and provides an optical field imaging system based on dual galvanometer scanning, which uses dual galvanometers to deflect the optical path in two directions respectively to realize the optimization of a scanning optical field microscope system, and solves the problems of rotation, stripes and sawteeth of the reconstructed image caused by single galvanometer scanning without losing the resolution performance of the original scanning optical field imaging system. At the same time, the position arrangement of the dual galvanometers of the present invention makes the whole system more compact and simpler in structure, and realizes stable and reliable shooting and reconstruction of samples; image reconstruction quality is higher; and the application of the scanning optical field imaging system in the biological field and precision treatment is greatly expanded.

DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
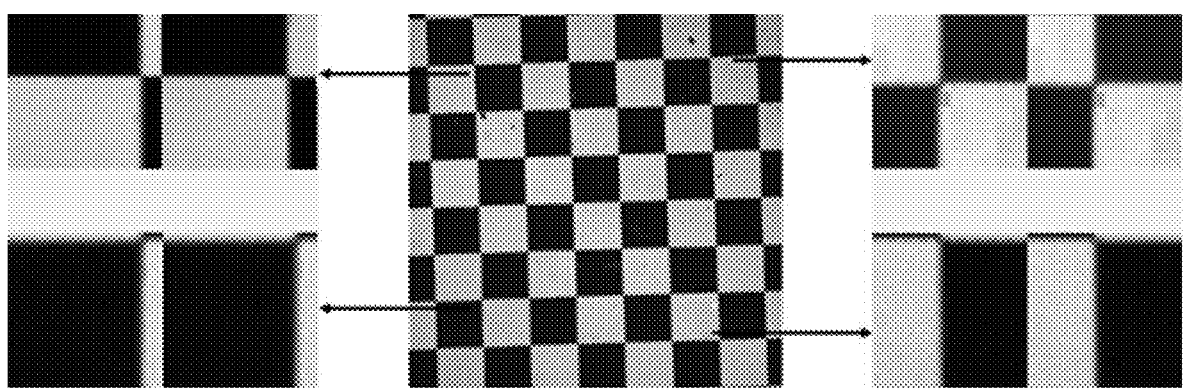
FIG. 1 shows the results of reconstructed images based on single galvanometer scanning.
Figure 2:
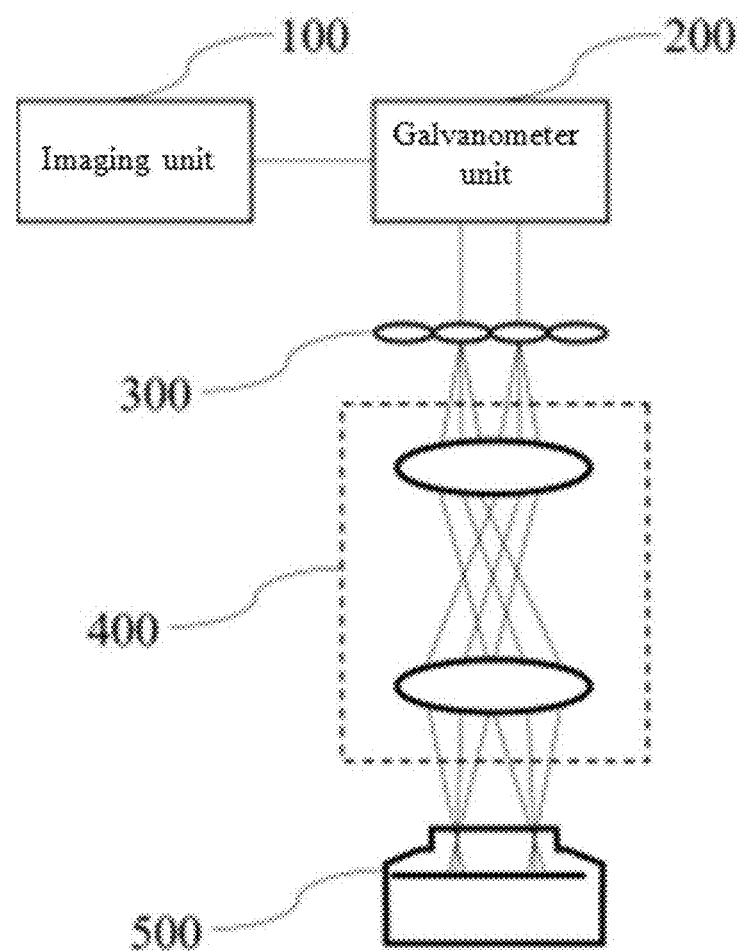
FIG. 2 is a structural schematic diagram of an optical field imaging system based on dual galvanometer scanning provided by the present invention.

As shown in FIG. 2, an embodiment of the present invention discloses an optical field imaging system based on dual galvanometer scanning, which comprises: an imaging unit 100, a galvanometer unit 200, a microlens array 300, a relay system 400 and a camera 500 which are arranged successively along a transmission direction of an optical path.

The imaging unit 100 is used for optically imaging a sample or a scenario, and inputting an imaging beam into the galvanometer unit 200. The imaging unit 100 can be a commercial wide-field microscope or constructed using a lens set.

The galvanometer unit 200 is composed of two non-parallel two-dimensional galvanometers which deflect beams in two directions of X axis and Y axis respectively, so that an input beam is perpendicular to an output beam.

The microlens array 300 is located at an image plane position, and used for obtaining beams of different angles at different spatial local positions outputted by the galvanometer unit 200. The microlens array images three-dimensional information onto a two-dimensional plane and modulates the information corresponding to different angles to different spatial positions corresponding to each microlens to realize the conversion from spatial dimension to phase spatial dimension.

The relay system 400 is used for realizing connection and regulation of the optical path so that the beams modulated by the microlens array 300 are imaged on the camera.

The camera 500 is used for performing an exposure imaging after each deflection of the galvanometer unit 200 to obtain stack information of optical field images.

Figure 3:
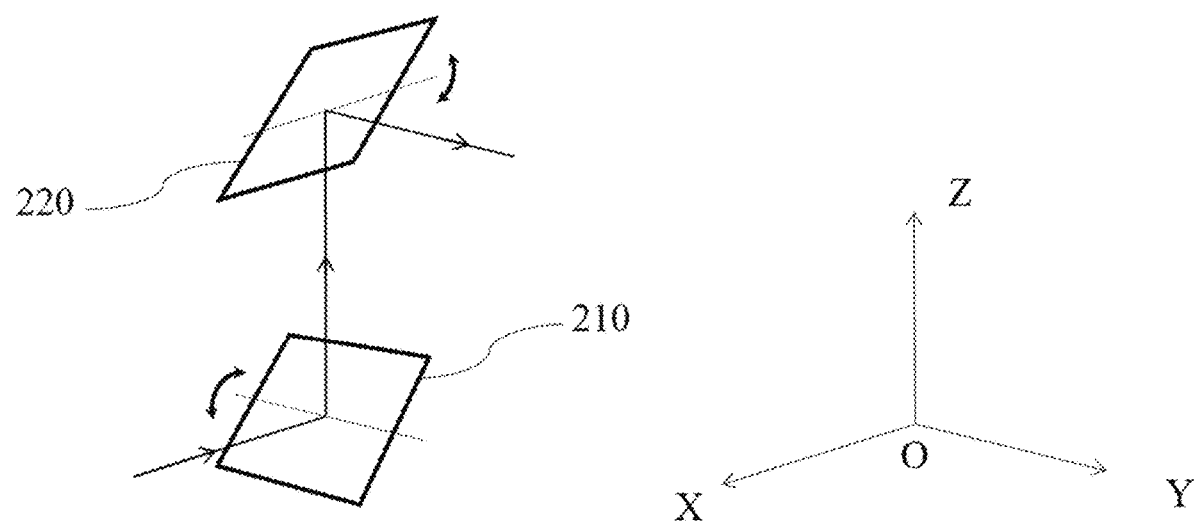
FIG. 3 is a structural schematic diagram of a galvanometer unit provided by the present invention.
Figure 4:
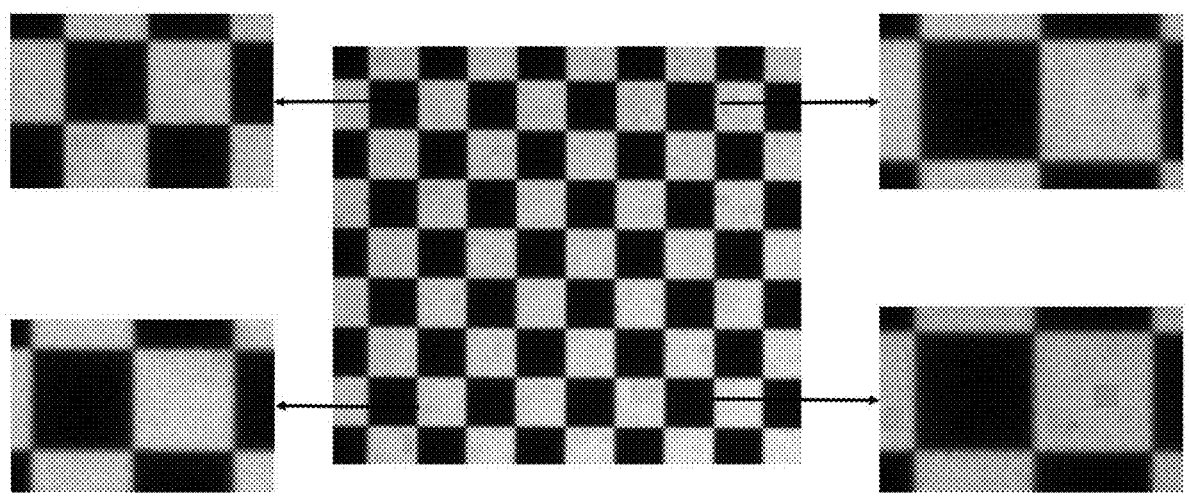
FIG. 4 is a three-dimensional reconstruction result diagram of an optical field imaging system based on dual galvanometer scanning provided by the present invention.

Specifically, as shown in FIG. 3, the galvanometer unit 200 comprises a first galvanometer 210 and a second galvanometer 220; O-XYZ is set as an established world coordinate system, wherein XOY is a horizontal plane, a rotation shaft of the first galvanometer 210 is parallel to a Y axis, a rotation shaft of the second galvanometer 220 is parallel to an X axis, and starting positions of the first galvanometer 210 and the second galvanometer 220 are at an angle of 45° with the XOY plane; and the input beam is inputted from an XO direction, transmitted in an OZ direction, and outputted from an OY direction, thereby achieving the vertical transmission of incident light and reflected light.

In the embodiment of the present invention, the galvanometer unit not only realizes deflection in two directions through two galvanometers, but also avoids the problems of rotation, stripes and sawteeth of the reconstructed image. By making the input beam perpendicular to the output beam, a subsequent device shell is a square box, which is more convenient to place and more beautiful. If the input beam and the output beam are not perpendicular, e.g., parallel, the system will be formed into a slender shape.

In an embodiment, deflection states of two two-dimensional galvanometers in the galvanometer unit 200 are controlled by a piezoelectric ceramic motor, which can achieve high-precision deflection of the two-dimensional galvanometer at angles and achieve high-speed and stable scanning of the samples.

In addition, the galvanometer unit 200 is deflected according to a set scanning mode, and the scanning mode is set on the basis that a corresponding image plane is offset by an integer number of pixel points on the camera when the galvanometer unit is deflected.

For example, each microlens on the microlens array 300 of the present invention will image 15×15 pixels on the camera and just cover them completely. On this basis, the scanning mode is set on the basis that a corresponding image plane is offset by several pixel points on the camera when the galvanometer is deflected, to ensure that the edge of the pixel is not imaged in the middle of the pixel points.

The two galvanometers are respectively responsible for the deflection in two directions x and y. Taking the 3×3 scanning mode as an example, each deflection angle of a single galvanometer is 0.15 mrad, which corresponds to the offset of 5 pixels on the camera.

In an embodiment, the relay system 400 comprises two convex lenses, and the beam is widened or narrowed by selecting lenses of different focal lengths to match the imaging of the camera for the microlens array 300.

In an embodiment, a signal receiving surface of the camera 500 is located at a rear focal plane of the relay system 400. Moreover, the camera uses a research type complementary metal oxide semiconductor transistor sCMOS.

More advantageously, the system of the present invention further comprises a control unit; the control unit is used for triggering the galvanometer unit to deflect and trigger the camera for exposure imaging after each deflection of the galvanometer unit; and in the process of exposure imaging of the camera, the galvanometer unit is controlled not to deflect. At the same time, two galvanometers in the galvanometer unit are deflected synchronously.

In an embodiment, the system of the present invention further comprises a three-dimensional reconstruction unit; the three-dimensional reconstruction unit is used for rearranging spatial pixels corresponding to the same spatial frequency component in the stack information of optical field images, and locating a central view corresponding to each microlens; and RL deconvolution iterative calculation of each central view is performed by using a corresponding theoretical point spread function of the central view, to perform three-dimensional reconstruction of the optical field images, wherein the theoretical point spread function of the central view is obtained by pre-simulation through Matlab software.

The process of optical field image acquisition and reconstruction by the optical field imaging system based on dual galvanometer scanning in the present invention is as follows:

Firstly, the sample is imaged by the imaging unit 100. Then, the beam is deflected by the two-dimensional galvanometer in the galvanometer unit 200 to achieve two-dimensional scanning on the microlens array 300 and achieve high-resolution modulation of the beam. Subsequently, the optical path modulated by the microlens array 300 enters the relay system 400 for widening or narrowing, so that the beam is matched with the camera 500. The camera 500 obtains the stack information of the optical field images. The three-dimensional reconstruction unit rearranges the spatial pixels corresponding to the same spatial frequency component in the image stack of the scanning optical field, positions the central view corresponding to the microlens array, and uses the corresponding theoretical point spread function of the central view and RL deconvolution iterative algorithm to achieve three-dimensional reconstruction of the optical field images, to finally obtain the high-resolution three-dimensional sample information.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. An optical field imaging system based on dual galvanometer scanning, comprising: an imaging unit, a galvanometer unit, a microlens array, a relay system, a camera and a control unit which are arranged successively along a transmission direction of an optical path, wherein the imaging unit is used for optically imaging a sample or a scenario, and inputting an imaging beam into the galvanometer unit;

the galvanometer unit is composed of two non-parallel two-dimensional galvanometers which deflect beams in two directions of X axis and Y axis respectively, so that an input beam is perpendicular to an output beam; the galvanometer unit comprises a first galvanometer and a second galvanometer; O-XYZ is set as an established world coordinate system, wherein XOY is a horizontal plane, a rotation shaft of the first galvanometer is parallel to a Y axis, a rotation shaft of the second galvanometer is parallel to an X axis, and starting positions of the first galvanometer and the second galvanometer are both at an angle of 45° with the XOY plane; and the input beam is inputted from an XO direction, transmitted in an OZ direction, and outputted from an OY direction;

the microlens array is located at an image plane position, and used for obtaining beams of different angles at different spatial local positions outputted by the galvanometer unit, and modulating the information corresponding to different angles to each microlens to correspond to different spatial positions;

the relay system is used for realizing connection and regulation of the optical path so that the beams modulated by the microlens array are imaged on the camera;

the camera is used for performing an exposure imaging after each deflection of the galvanometer unit to obtain stack information of optical field images;

the control unit is used for triggering the galvanometer unit to deflect and trigger the camera for exposure imaging after each deflection of the galvanometer unit; and in the process of exposure imaging of the camera, the galvanometer unit is controlled not to deflect.

2. The optical field imaging system based on dual galvanometer scanning according to claim 1, wherein deflection states of two two-dimensional galvanometers in the galvanometer unit are controlled by a piezoelectric ceramic motor.

3. The optical field imaging system based on dual galvanometer scanning according to claim 1, wherein the galvanometer unit is deflected according to a set scanning mode, and the scanning mode is set on the basis that a corresponding image plane is offset by an integer number of pixel points on the camera when the galvanometer unit is deflected.

4. The optical field imaging system based on dual galvanometer scanning according to claim 1, wherein the relay system comprises two convex lenses, and the beam is widened or narrowed by selecting lenses of different focal lengths to match the imaging of the camera for the microlens array.

5. The optical field imaging system based on dual galvanometer scanning according to claim 1, wherein a signal receiving surface of the camera is located at a rear focal plane of the relay system.

6. The optical field imaging system based on dual galvanometer scanning according to claim 1, further comprising a three-dimensional reconstruction unit, wherein the three-dimensional reconstruction unit is used for rearranging spatial pixels corresponding to the same spatial frequency component in the stack information of optical field images, and locating a central view corresponding to each microlens; and RL deconvolution iterative calculation of each central view is performed by using a corresponding theoretical point spread function of the central view, to perform three-dimensional reconstruction of the optical field images, wherein the theoretical point spread function of the central view is obtained by pre-simulation.

* * * * *